US012811820B2

(12) United States Patent
Shaffer et al.

(10) Patent No.: US 12,811,820 B2
(45) Date of Patent: Nov. 24, 2026

(54) SYSTEMS AND METHODS FOR IDENTIFYING AN INSTALLATION LOCATION OF A THERMOSTAT DEVICE

(71) Applicant: Universal Electronics Inc., Scottsdale, AZ (US)

(72) Inventors: Jacob Shaffer, Phoenix, AZ (US); Michael Hoffman, Poway, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 96 days.

(21) Appl. No.: 18/813,659

(22) Filed: Aug. 23, 2024

(65) Prior Publication Data

US 2025/0080374 A1 Mar. 6, 2025

Related U.S. Application Data

(60) Provisional application No. 63/579,706, filed on Aug. 30, 2023, provisional application No. 63/579,115, filed on Aug. 28, 2023.

(51) Int. Cl.
*H04L 12/28* (2006.01)
*F24F 11/54* (2018.01)

(52) U.S. Cl.
CPC .......... *H04L 12/2809* (2013.01); *F24F 11/54* (2018.01); *H04L 12/2823* (2013.01)

(58) Field of Classification Search
CPC ............ H04L 12/2809; H04L 12/2823; G05D 23/1902; G05D 23/1905; F24F 11/30; F24F 11/88
See application file for complete search history.

(56) References Cited

U.S. PATENT DOCUMENTS

| | | | | |
|---|---|---|---|---|
| 6,169,937 | B1 | 1/2001 | Peterson | |
| 9,939,824 | B2 * | 4/2018 | Nelson | G05D 23/1905 |
| 10,955,162 | B2 * | 3/2021 | Gillette | G05D 23/1905 |
| 2006/0071089 | A1 | 4/2006 | Kates | |
| 2009/0101726 | A1 | 4/2009 | Rankich | |
| 2010/0163633 | A1 | 7/2010 | Barrett | |
| 2015/0327010 | A1 * | 11/2015 | Gottschalk | G05B 15/02 455/456.1 |
| 2017/0146260 | A1 * | 5/2017 | Ribbich | G05B 19/0426 |
| 2018/0259206 | A1 | 9/2018 | Uselton | |
| 2018/0286213 | A1 * | 10/2018 | Schueler | H04W 52/0216 |
| 2019/0020495 | A1 * | 1/2019 | Roosli | H04L 12/2825 |
| 2020/0213263 | A1 * | 7/2020 | Allinson | H04L 67/52 |
| 2021/0216091 | A1 * | 7/2021 | Fang | H04L 67/12 |

OTHER PUBLICATIONS

International Search Report and Written Opinion of international application No. PCT/US24/43795, dated Dec. 3, 2024, 6 pp.

* cited by examiner

*Primary Examiner* — Patrice L Winder
(74) *Attorney, Agent, or Firm* — Greenberg Traurig, LLP

(57) ABSTRACT

A heating and/or cooling equipment (HVAC) control system includes a subbase a thermostat releasably engageable with the subbase. An encoder is physically associated with the subbase. The provides information to the thermostat when the thermostat is coupled to the subbase. The information at least uniquely identifies the thermostat to a centralized HVAC system provided to control HVAC related functionalities in each of a plurality of rooms in a building.

6 Claims, 5 Drawing Sheets

SYSTEMS AND METHODS FOR IDENTIFYING AN INSTALLATION LOCATION OF A THERMOSTAT DEVICE

RELATED APPLICATION INFORMATION

This application claims the benefit of U.S. 63/579,115, filed on Aug. 28, 2023, and U.S. 63/579,706 filed on Aug. 30, 2023 the disclosures of which are incorporated herein by reference in their entireties.

FIELD OF THE DISCLOSURE

The present disclosure relates generally to supervisory control of a thermostat and more particularly to systems and methods for identifying installation configuration and installation location of a thermostat device.

BACKGROUND OF RELATED ART

Thermostats have been used for decades to control room temperatures based on user settings and temperature sensors commonly built into the thermostats. Thermostats typically control heating and/or cooling equipment (HVAC) by turning the equipment on or off. For example, when a room temperature where a thermostat is located drops below a heating setpoint, the thermostat sends a signal to heating equipment to begin heating the room. When the setpoint has been reached or exceeded, the thermostat sends another signal to the heating equipment to turn off.

Hotels are looking for better ways to manage their thermostats for energy savings, etc. One way is to use some form of supervisory control to the thermostat in each room/suite/apartment of the hotel/Multiple Dwelling Unit (MDU) such as changing the temperature setpoint during unoccupied times (referred to hereinafter as 'hotel' and 'room'). However, the thermostat must be assigned to a particular room to control the temperature of the correct room. One way of doing this is to assign an identifier on each thermostat such as the MAC ID to each room and this information is put in the database. The problem is that anytime a thermostat is replaced, the ID of the replacement thermostat must be updated in the database to be assigned to the correct room. If this is not done accurately, the supervisory control may be controlling the temperature setpoint in the wrong room(s) and the data will be wrong.

DETAILED DESCRIPTION

The following description of example methods and apparatus is not intended to limit the scope of the description to the precise form or forms detailed herein. Instead, the following description is intended to be illustrative so that others may follow its teachings.

In one example, the objective of the invention is to automatically assign specific thermostats to a room or apartment in a hospitality, rental, business location, or other MDU as desired on an external database, so the correct room temperature is being controlled by the supervisory controller. The disclosed systems and methods herein may reduce errors in room temperature control when maintaining the thermostat systems.

For example, when there is a problem with a thermostat, the thermostat is replaced and the subbase that is attached to the HVAC wiring is typically not replaced. Therefore, if there is a way to assign the room number and/or the system configuration to the subbase, and the room number and/or the system configuration is communicated to the thermostat installed on the subbase, then the room number and/or the system configuration assignment to the thermostat can be automatically updated in the database. This invention provides example methods of assigning a room number and/or the system configuration to the subbase that can be sent to the thermostat when it is connected and therefore automatically assign the correct thermostat for each room to the external database and/or assign the correct system configuration for the room.

Figure 1:
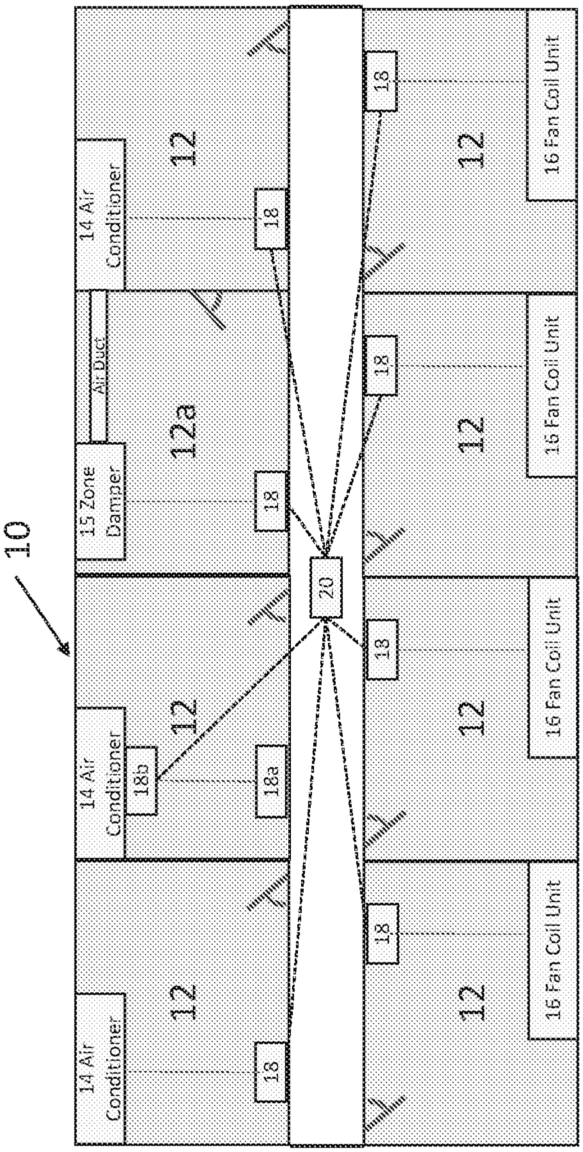
FIG. 1 is a top, plan view of an example MDU structure including an example method and system for identifying an installation location of a thermostat device in accordance with the present invention.

Referring now to FIG. 1, an example of a typical MDU or hotel arrangement is illustrated. More precisely, FIG. 1 is a top, plan view of a single floor MDU structure 10 comprising a plurality of rooms 12 having an air conditioner 14, a zone damper 15 and/or a fan coil unit 16, and at least one thermostat 18 per zone that controls the temperature of the air in each zone. It will be understood that each of the rooms 12 may be further divided into additional rooms 12*a* and/or zones that each may independently include a separate thermostat 18 air conditioner 14, zone damper 15 or fan coil unit 16. It will be understood that the thermostat has several functions, and those functions may be located in different locations such as on the wall 18*a* for the user interface and temperature measurement of the ambient air and on the source of conditioned air 18*b* on the air conditioner 14, the zone damper 15 or the fan coil unit 16 for temperature loop control and external communication to the centralized system 20. Either part of the thermostat 18*a*, 18*b* may have a subbase and benefit by having the room number and/or the system configuration assigned to individual components of the thermostat 18*a*, 18*b*. As is known in the art, each of the thermostats 18 comprises and/or is in communication with a temperature sensor that senses the ambient temperature of the room or zone where the thermostat 18 is located and controls the source of conditioned air for the zone. In some embodiments, the thermostat 18 may be configured to receive one or more temperature sensor inputs from temperature sensors located in other parts of structure 10.

Like many modern or "smart" thermostats, each of the thermostats 18 may be programmable to execute one or more temperature profiles in the form of desired temperature setpoints and times when these setpoints should be achieved. These temperature profiles may be locally programmed, but in many instances, it is desirable to provide a centralized system 20 to control the temperature profiles in each of the rooms 12. For example, the centralized system 20 may set each thermostat 18 to warm the associated room 12 or zone to an ambient temperature of 72 degrees Fahrenheit at 7 am when the user or guest typically wakes, and of no less than 60 degrees Fahrenheit at 10 pm when the user typically goes to bed. Of course, it will be appreciated that the temperature profiles may vary significantly based upon any variety of factors, including current weather, current occupancy, user preferences, cost of electricity, room location, or any other suitable consideration.

As with any MDU location, it will be understood that the system thermostats 18 oftentimes need to be changed for maintenance, replacement, relocation, etc. It will further be appreciated that the task of replacing multiple thermostats 18 may be cumbersome if each thermostat 18 needs to be specifically reprogrammed or otherwise have its specific location identified within the centralized system 20.

The subbase 26 may include location information that may be utilized by the centralized system 20 to program or otherwise configure, maintain, data download/upload, or update the firmware/software of the thermostat 18 in addition to identifying the room number or apartment location. For example, the thermostat 18 may be programmed to query the centralized system 20 upon startup/shutdown to ensure up-to-date compliance. The subbase 26 may also include information on the system configuration of the air conditioner 14, the zone damper 15 or the fan coil unit 16 the thermostat 18 is controlling. For example, the subbase 26 may include configuration information regarding what type of a unit it is controlling such as a heat pump or conventional air conditioner or what the fan operation should be set to.

Figure 2:
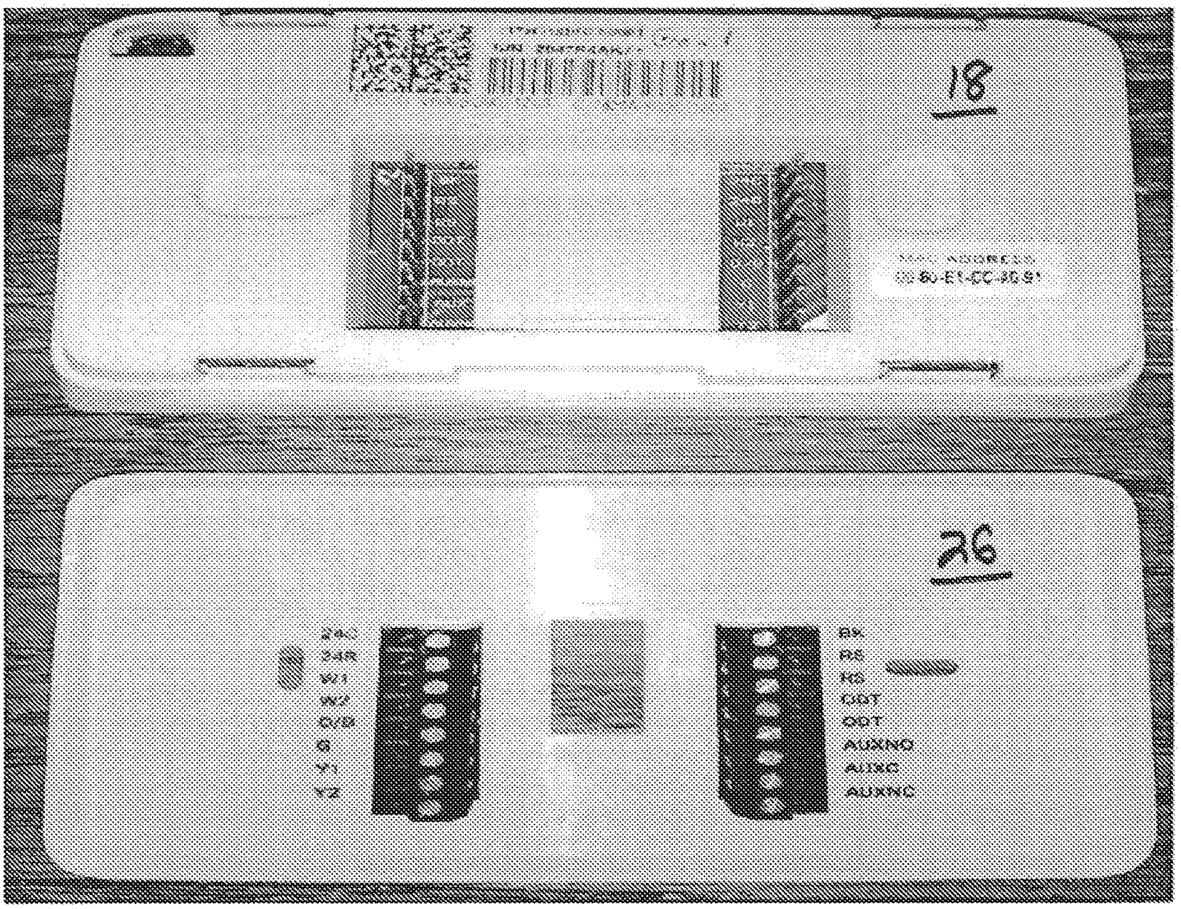
FIG. 2 is a rear elevational view of an example thermostat device.
Figure 3:
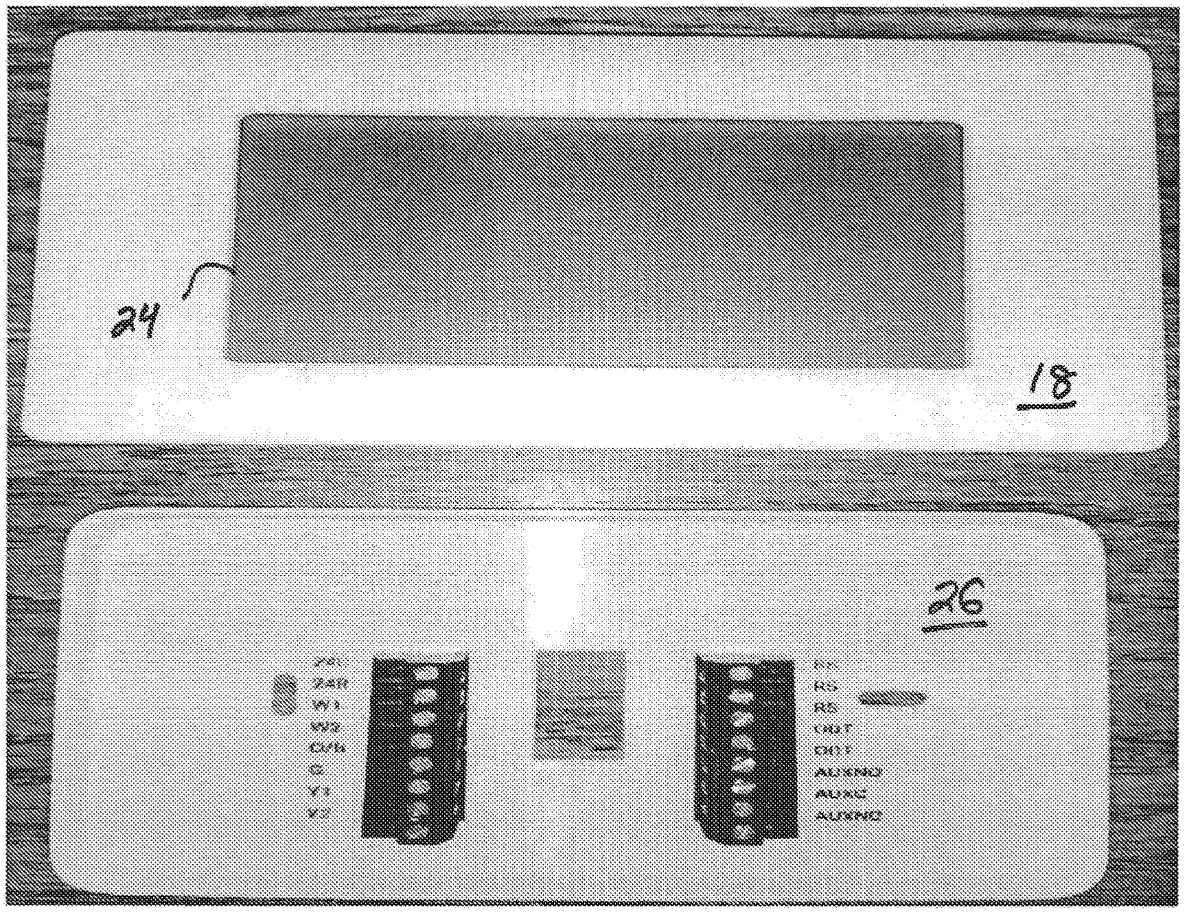
FIG. 3 is a front elevational view of an example thermostat device.
Figure 4:
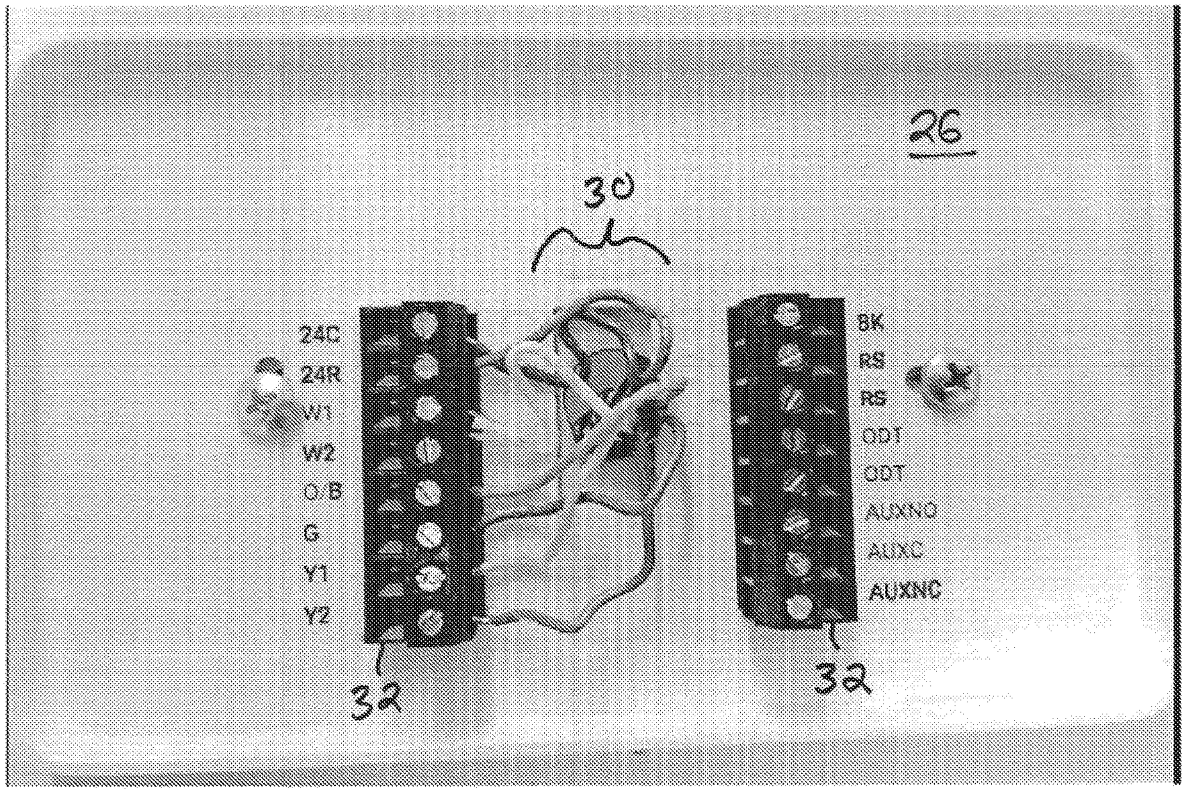
FIG. 4 is a rear elevational view of an example subbase assembly for use with the example thermostat device.

FIG. 2 shows the back of a typical thermostat assembly comprising the thermostat 18 having a display portion 24 coupled to a mounting subbase 26. FIG. 3, meanwhile shows the front of the same thermostat 18 including the display portion 24 and the subbase 26. When the thermostat 18 is installed, the subbase 26 is typically mounted to the wall and system wiring 30 is connected to the subbase as shown in FIG. 4. The system wiring 30 is typically hardwired to the subbase 26, but in other examples, the subbase 26 may communicate with the system 10 via any suitable communication method, including wireless communications. Once the subbase is mounted, the thermostat 18 is then connected (e.g., snapped) onto the subbase 26 and connections from the subbase 26 are made from wiring lugs 30 on the subbase 26 through pins 32 on the back of the thermostat 18. The thermostat 18 then has connections to the subbase 26 and therefore all the wires 30 coupled to the subbase 26. The subbase 26 is typically installed in a semi-permanent location and is not typically replaced and/or moved when performing any system maintenance and unless the subbase 26 is defective or needs to be otherwise relocated.

On many thermostat installations, not all the pins 32 are used that connect to the subbase 26. In fact, there are many system configurations that need less than the total wire connections available for a thermostat to control the coupled HVAC system. Therefore, some of the pins 32 may be available for other purposes, including for instance to provide communication between the subbase 26 and the thermostat 18. In the example thermostat 18 shown, only the eight (8) connections on the left side of the illustrated subbase 26 are needed. Therefore, the eight (8) connections on the right side of the illustrated subbase 26 can be utilized for assignment of the room number, or other suitable location identifier, to the subbase 26 and communicated to the thermostat 18 and/or the centralized system 20.

More precisely, in some examples the room number, or other location identifier (hereinafter broadly termed "room", "rooms", "room location", etc.), is assigned to the subbase 26 and communicated to the thermostat 18. For instance, in a first passive example (e.g., no active electronic components), the subbase 26 may utilize a plurality of switches, such as dip switches on the subbase 26 to pull the pins to a high or low designation. This example programming method can be used to designate up to 256 rooms with 8 pins (or 128 rooms if one pin is needed for reference) available (28) and an encoder chart will be needed to identify to what room the subbase 26 is assigned.

In this example, the room number assignment may be labeled and/or otherwise marked on the front of the subbase 26, such as for instance with a permanent marker for quick reference. In addition, a decoder table is needed in the thermostat to interpret the room assignment communicated from the subbase 26.

In another example of a passive programming method, a multi-position encoder may be used to define the specific room number on the subbase 26. The example encoders may have different levels of resistance for each coded digit and can, therefore, be decoded by the thermostat 26 to identify the room number the subbase 26 is assigned to. Reading the room number on the encoders provides for an easier identification of the room number assignment just by reading the encoder settings. In this example, the number of pins needed is the same as the number of encoders on the subbase plus, optionally, one additional for reference.

In the encoder example, it may be beneficial to locate the encoders on the back side of the subbase 26 (i.e., facing the mounting surface upon installation) so that the encoder cannot be tampered with after installation. In this case, the room number assignment may, once again, be marked on the front of the subbase 26 with any suitable marking method including with permanent marker for quick reference.

In still another example of a passive installation, the example methods may use multi-position encoders and diodes to block both halves, upper half, lower half, or neither half of a sine wave signal on a 24 VAC power line. In this installation example, the reference would be the other side of the thermostat power, typically the 'C' wire, and would allow for 4096 room combinations with 8 pins.

In still other passive programming examples, various scannable encoders may be utilized, such as for example bar codes, quick response code (QR Codes), near-field communication tags (NFC tags), Radio Frequency Identification tags (RFID tags), or other similar encoding device. In these examples, the various encodes may be attached to or otherwise mounted to the subbase 26 and configured to be scanned or otherwise read by the thermostat 18.

Figure 5:
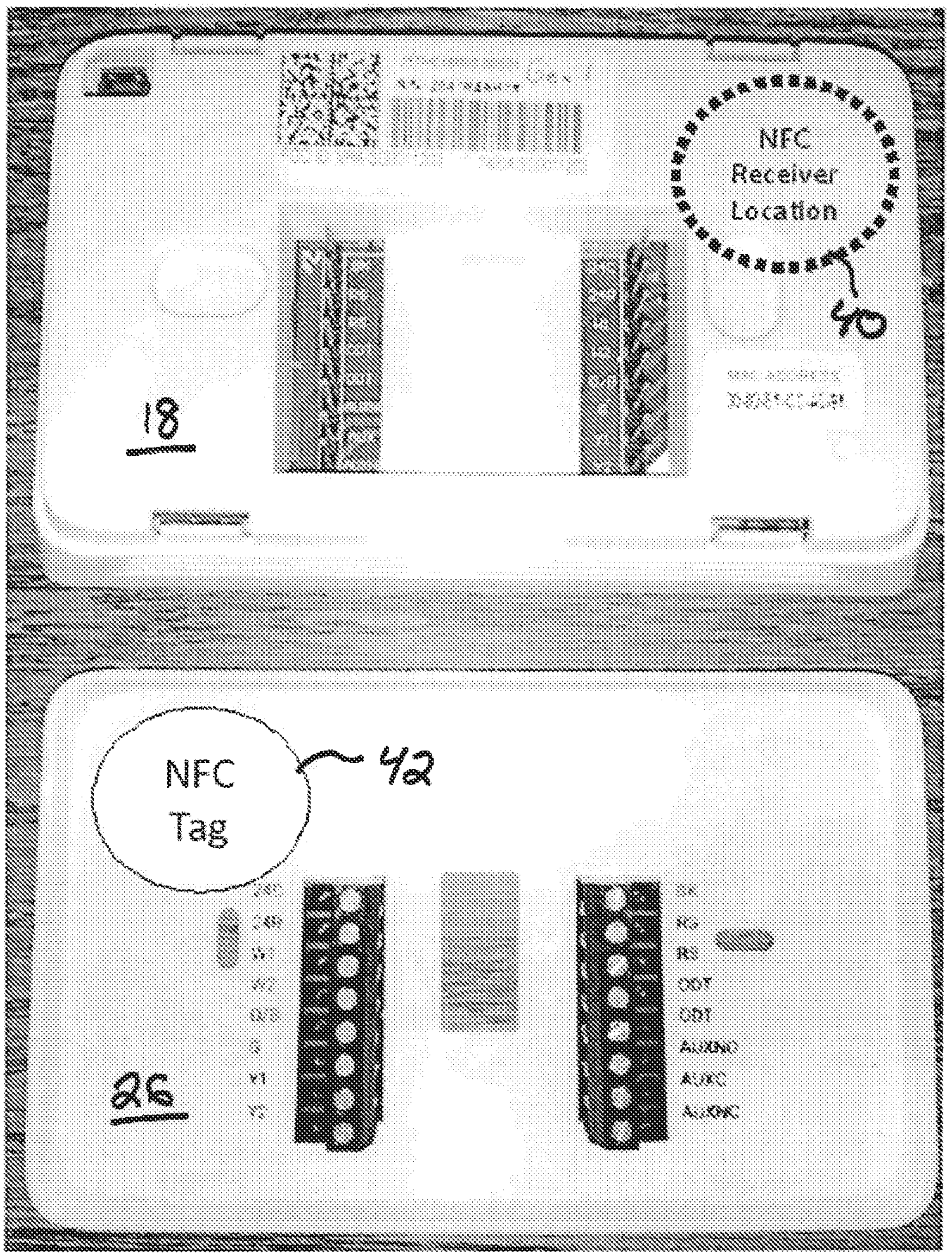
FIG. 5 is an example thermostat device including an NFC tag and receiver.

In one example, the method of implementation includes the use of an NFC tag on the subbase 26 and an NFC receiver on the printed circuit board (PCB) of the thermostat 18. In this instance, NFC tags are very inexpensive and the NFC hardware for the receiver is relative cheap as well. The implementation of this on the TW780 is shown in FIG. 5, which includes an illustration of an NFC receiver 40 and an NFC tag 42. The NFC tag 42 is shown on the subbase 26 and the location of the NFC receiver 40 is behind the plastic on the thermostat PCB (not shown). In this implementation, any time the power is started on the thermostat 18 such as when it is mounted to the subbase 26, the thermostat 18 will activate the NFC receiver 40 to read the location and configuration parameters. Further, it will be appreciated that the thermostat 18 could also be programmed to read the parameters identified on the NFC tag 42 after other events such as an over the air software update.

In yet other examples, an active signal may be utilized, requiring "active" electronic components on the subbase 26 to communicate with the thermostat 18. In a first example, the system may utilize an "active" electronic circuit such as a gate array, microprocessor, or other suitable circuit, to interpret the setting on the multi-position encoders and communicate them using a standard communication bus such as I2C, Serial Peripheral Interface (SPI), or a proprietary protocol to the thermostat, as desired. In this example, the number of rooms would only be limited by the number of encoder setting combinations. Additionally, the number of pins required for communication to the thermostat is based on the number of pins needed for the protocol, such as for example, three (3) pins for I2C.

In another solution utilizing an active communication, a wireless link between the subbase 26 and the thermostat 18 may be utilized to transfer the subbase room setting to the thermostat. This example may require the use of a tool to ensure the thermostat is communicating with the correct subbase. For instance, the tool may be any suitable communication monitoring device, such as a phone, computer application (APP) that can communicate with both to establish the connection, or other suitable device. Once the connection is made the thermostat 18 stores the noted subbase address in non-volatile memory to ensure the correct subbase is consistently selected, such as after a power cycle.

Accordingly, and in compliance with the present disclosure, by adding the described smart configuration technology allows for easy configuration and on-boarding of the thermostat and also enables an easy way to replace a thermostat in the room without inconveniencing the guest or requiring the thermostat to be reprogrammed. This has potential to save a property manager time and/or money by allowing for the operator to simply replace the thermostat and transfer the room number, SSID, Mac Address, and/or system configuration to the new thermostat.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed:

1. A heating and/or cooling equipment (HVAC) control system, comprising:

a subbase directly mountable to a mounting surface and including a first connection assembly to which wiring associated with HVAC components of the HVAC system is directly connected;

a thermostat releasably couplable with the subbase, the thermostat having a second connection assembly cooperable with the first connection assembly, a temperature sensor, a temperature profile for causing a control signal to be provided to the wiring via the second connection assembly when coupled to the first connection assembly as a function of a temperature sensed by the temperature sensor, and a transceiver for communicating with a centralized controller for the HVAC system; and an encoder physically associated with the subbase, the encoder providing to the thermostat identifying information, wherein, via the transceiver, the thermostat communicates the unique information to the centralized controller for the HVAC system and the centralized controller for the HVAC system controls the temperature profile as a function of the identifying information.

2. The HVAC control system as recited in claim 1, wherein the encoder comprises a plurality of electrical pins to which the thermostat is electrically coupled when engaged with the subbase and a corresponding plurality of switches activatable to encode the plurality of electrical pins with the identifying information.

3. The HVAC control system as recited in claim 2, wherein the plurality of switches are located on a first side of the subbase and wherein the plurality of pins are located on a second side of the subbase opposite to the first side.

4. The HVAC control system as recited in claim 1, wherein the encoder comprises a plurality of electrical pins to which the thermostat is electrically coupled when engaged with the subbase and each of the plurality of pins is provided with a resistance level to encode the plurality of electrical pins with the identifying information.

5. The HVAC control system as recited in claim 1, wherein the encoder comprises a plurality of electrical pins to which the thermostat is electrically coupled when engaged with the subbase, each of the plurality of pins is associated with a diode, and a sine wave signal on a 24 VAC power line is used to encode the plurality of electrical pins with the identifying information.

6. The HVAC control system as recited in claim 1, wherein the encoder comprises a near field communication device physically coupled to the subbase and readable by the thermostat.

* * * * *